United States Patent [19]

Sieghartner

[11] Patent Number: 5,238,253
[45] Date of Patent: Aug. 24, 1993

[54] REGENERATIVE TURBINE FLOW INDUCER FOR DOUBLE OR TANDEM MECHANICAL SEALS

[75] Inventor: Leonard J. Sieghartner, Coal Valley, Ill.

[73] Assignee: Roy E. Roth Company, Chicago, Ill.

[21] Appl. No.: 689,462

[22] Filed: Apr. 22, 1991

[51] Int. Cl.⁵ .............................................. F16J 15/50
[52] U.S. Cl. ...................................... 277/61; 277/65; 277/67; 277/68; 277/87; 277/93 SD; 415/112; 415/113; 415/230; 415/231
[58] Field of Search ................ 415/110, 111, 112, 113, 415/170.1, 229, 230, 231; 277/15, 67, 74, 81 R, 86, 96.1, 133, 61, 65, 68, 87, 93 SD

[56] References Cited

U.S. PATENT DOCUMENTS

| | | |
|---|---|---|
| 2,875,698 | 3/1959 | Roth . |
| 3,227,463 | 1/1966 | Wiese ................................ 277/96.1 |
| 3,608,910 | 9/1971 | Tyler .................................. 415/112 |
| 3,614,256 | 10/1971 | Sieghartner . |
| 3,963,371 | 6/1976 | Sieghartner . |
| 4,248,571 | 2/1981 | Sieghartner . |
| 5,011,369 | 4/1991 | Mine et al. . |
| 5,017,086 | 5/1991 | Hansen . |

OTHER PUBLICATIONS

Brochure of Roth Pump Company, Rock Island, Ill., Bulletin A101 (Revised Apr. 1984) entitled "Roth Regenerative Centrifugal Turbine Pumps".
Brochure of Roth Pump Company, Rock Island, Ill., Bulletin L100 (Revised Jan. 1984) entitled "Roth In--Line Regenerative Chemical Pumps".

*Primary Examiner*—Edward K. Look
*Assistant Examiner*—Christopher Verdier
*Attorney, Agent, or Firm*—Emrich & Dithmar

[57] ABSTRACT

A regenerative turbine flow inducer for moving lubricating fluid through a seal chamber of a bearing assembly for lubricating sealing surfaces includes a turbine impeller rotated by the shaft and a pair of liners which enclose the impeller, the liners defining fluid inlets on both sides of the impeller, which are communicated with a source of lubricating fluid, and a fluid discharge outlet, the liners containing lubrication fluid supplied thereto and directing the fluid to the impeller as the impeller is rotated, drawing lubrication fluid through the liners. The regenerative turbine flow inducer may be used with double or tandem mechanical seals.

18 Claims, 6 Drawing Sheets

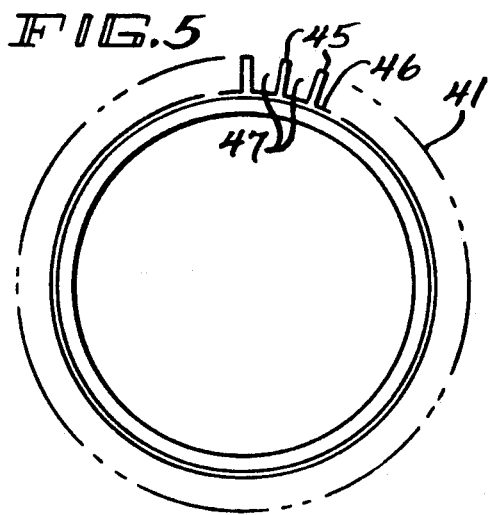
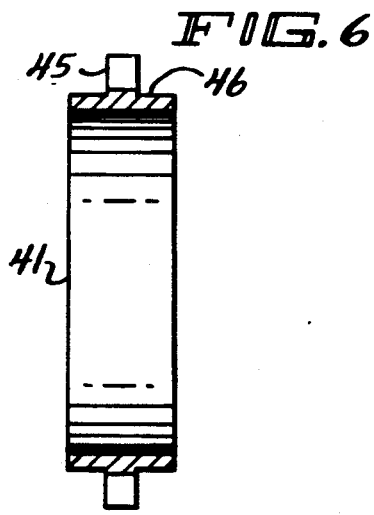
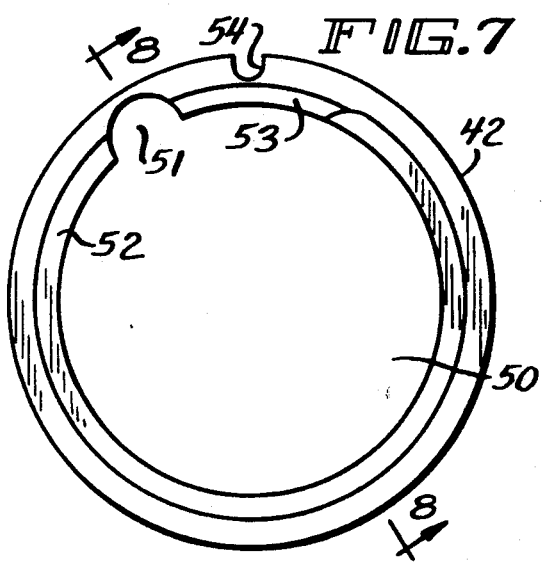
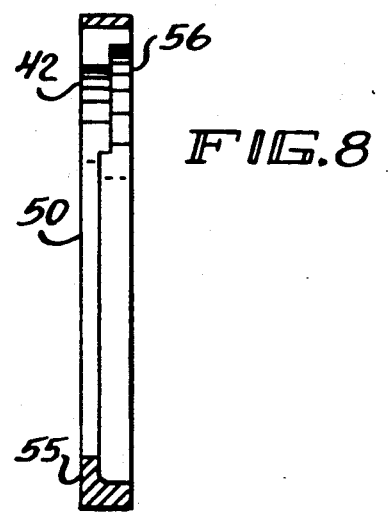
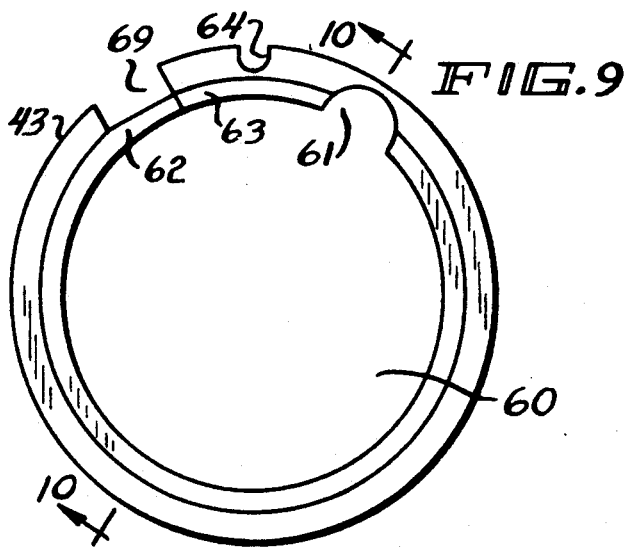
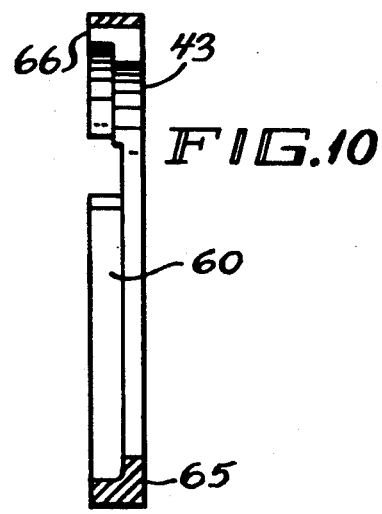

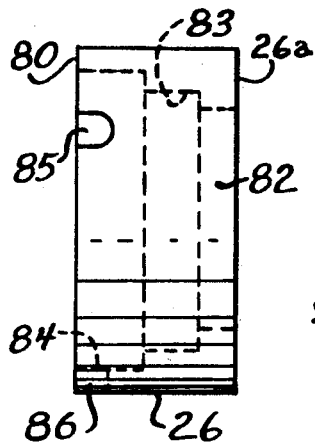
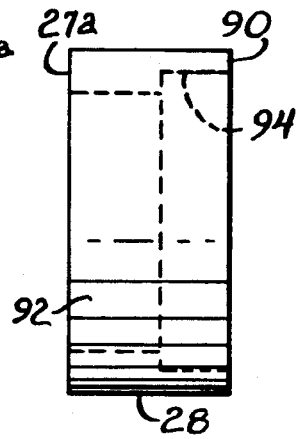
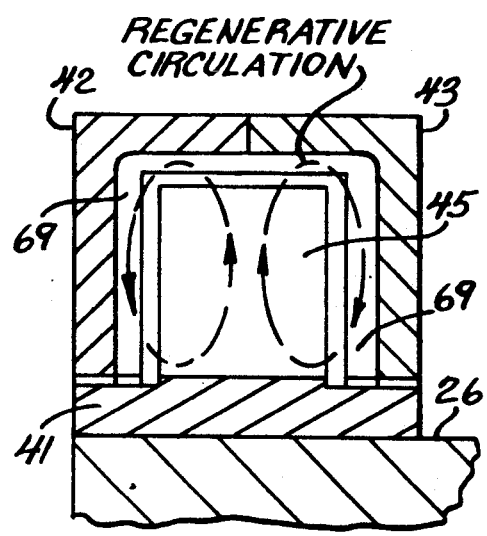
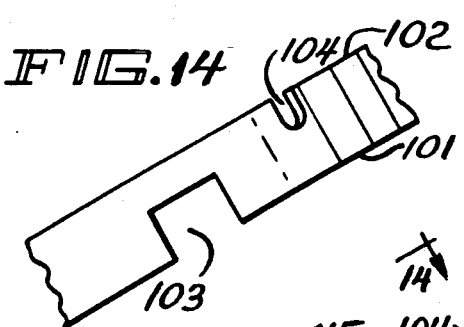
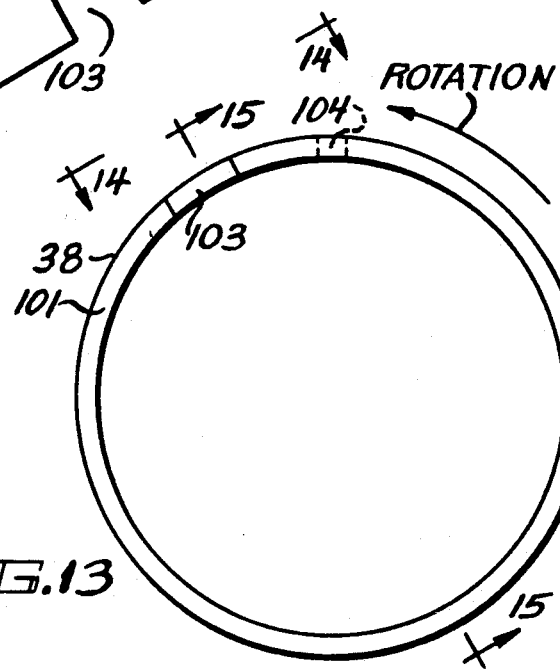
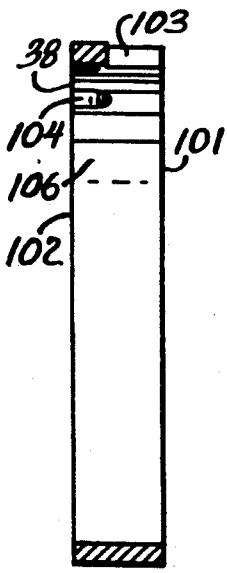

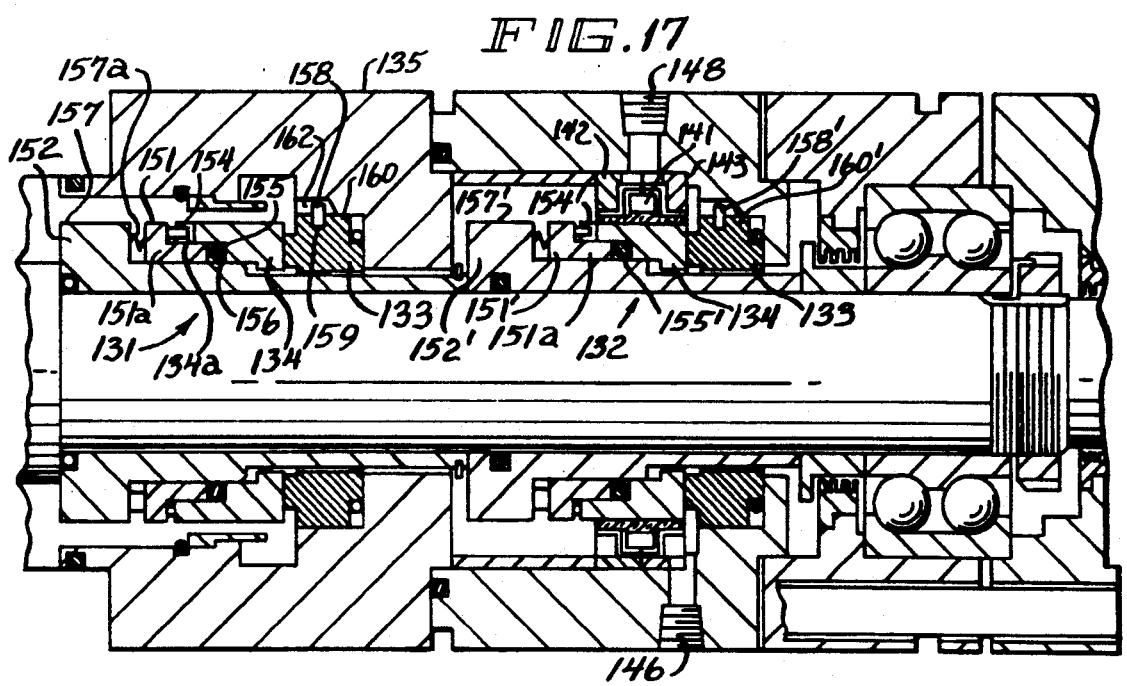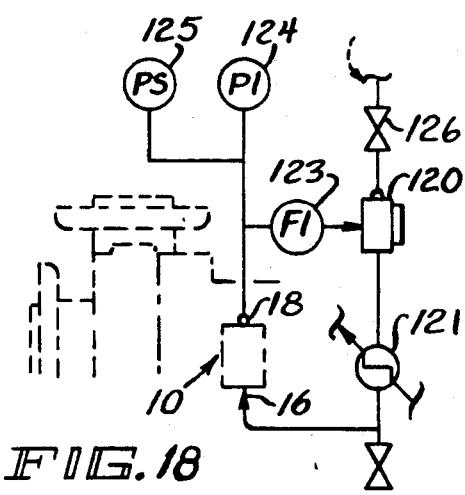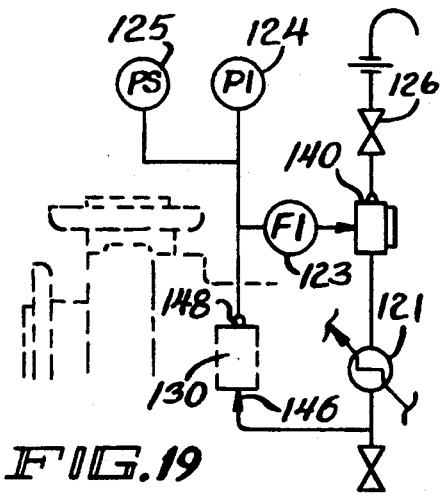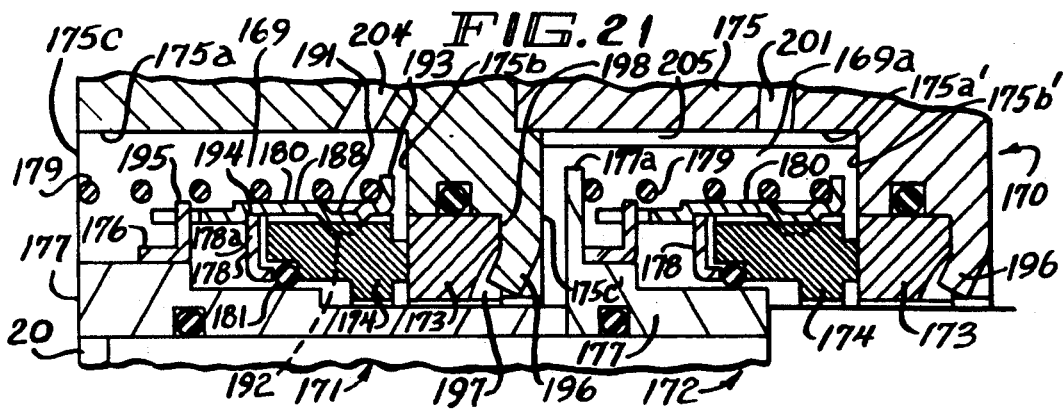

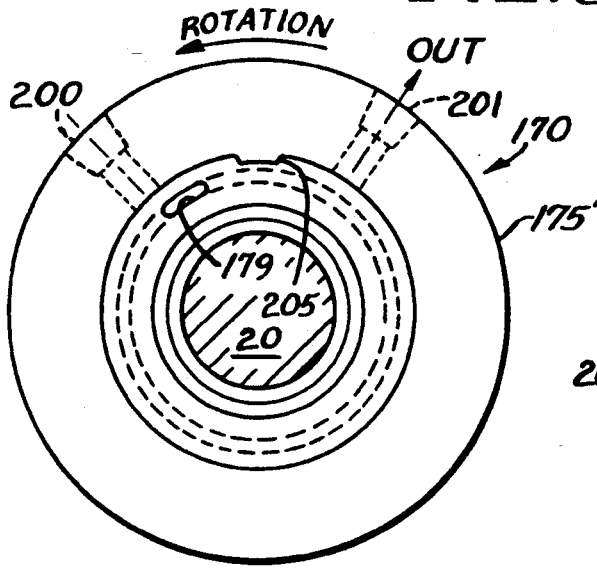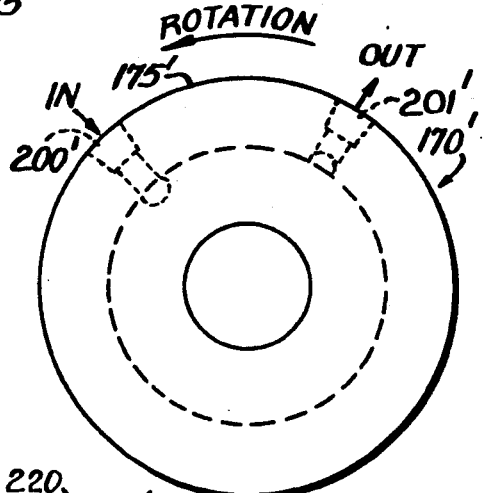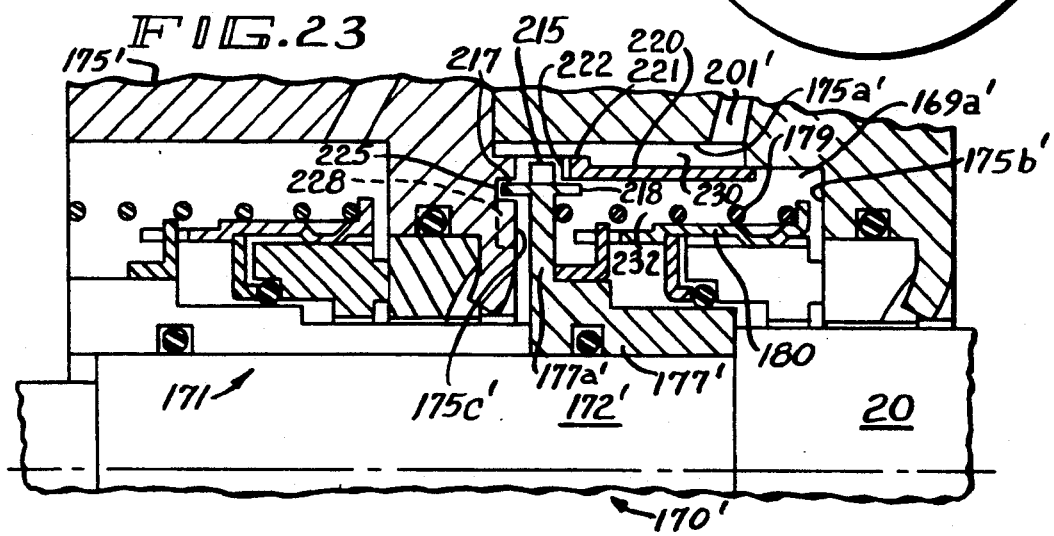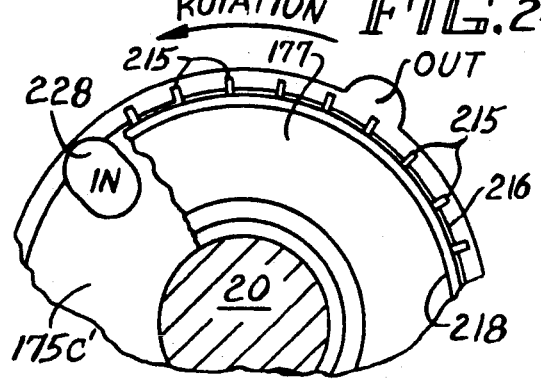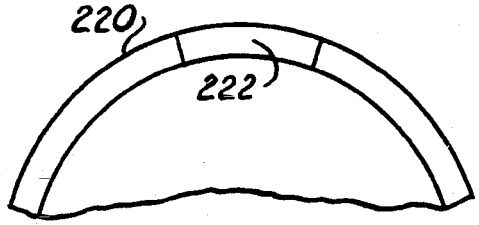

REGENERATIVE TURBINE FLOW INDUCER FOR DOUBLE OR TANDEM MECHANICAL SEALS

BACKGROUND OF THE INVENTION

This invention relates to liquid pumps, and more particularly, to an improved flow inducer arrangement for double or tandem seals in a liquid pump.

In liquid pump assemblies which employ double or tandem seals, a buffer fluid must be circulated between the two seal faces to maintain proper lubrication. In known systems, a reservoir containing a suitable fluid is communicated with the interior of the pump to supply the fluid to the mating or opposing seal faces. Typically, the capacity of the reservoir varies from one quart to five or more gallons. To assure circulation and thereby avoid overheating of the seals and the fluid, various approaches have been tried. In one approach, which is commonly referred to as thermo syphon, the outlet of the reservoir is communicated with the seal cavity permitting the lubricating fluid to be drawn into the seal cavity and moved therethrough. This arrangement has not proven satisfactory because of the small and uncertain flow conditions provided, particularly when the liquid in the main pump is a volatile fluid. In such case, gas can be forced into the seal cavity resulting in air or vapor bind in the thermal-syphon circulation path.

Another attempt at avoiding overheating of the seals and lubricating fluid is the use of agitation of the seal rotary units. However, this arrangement does not provide sufficient differential pressure to assure that circulation of the lubricating fluid through the seal cavity is maintained.

Another arrangement which is employed uses a "pumping ring" or impeller with radial or spiral notches which is located within the seal cavity and rotated, drawing lubricating fluid into the seal cavity. However, this arrangement does not include a means to contain the fluid and direct its flow and thus does not achieve adequate differential pressure to maintain the required circulation of the liquid through the seal cavity.

Therefore, it would be desirable to have a circulation system which is constructed and arranged to contain the lubricating fluid and direct its flow so as to avoid overheating of the seals and of the fluid.

SUMMARY OF THE INVENTION

It is therefore an object of the present invention to provide an improved flow inducer for double or tandem mechanical seals in a liquid pump or the like.

Another object of the invention is to provide a regenerative turbine flow inducer which maintains circulation of lubricating fluid through a seal cavity of a liquid pump or the like.

Another object of the invention is to provide an improved regenerative turbine flow inducer which is characterized by higher pressure heads than previously attainable.

Another object of the invention is to provide an improved regenerative turbine flow inducer which provides a positive action which inherently resists air or vapor bind.

Yet another object of the present invention is to provide a tandem seal arrangement which is characterized by minimal axial length.

Still another object of the invention is to provide an improved sealing arrangement including an O-ring sealing member with follower which compensates for compression set of the O-ring sealing member.

The present invention is comprised of an apparatus including a housing, a rotatable shaft extending through the housing, support means supporting the shaft in the housing, the housing defining a seal chamber, said support means including at least one seal assembly in the seal chamber, the seal assembly including two fixed seal means having a sealing surface and a rotatable seal means having two sealing surfaces engaging the sealing surface of the fixed seal means of the seal assembly, the housing having a fluid inlet port and a fluid outlet port, the inlet port communicating with the seal chamber and being connectable to a source of lubricating fluid, the outlet port communicating with the seal chamber, and flow inducing means for moving lubricating fluid through the seal chamber from the inlet port to the outlet port, comprising an impeller rotatably mounted in the seal chamber, enclosing means enclosing the impeller, the enclosing means having a fluid inlet and a fluid outlet in fluid communication with the inlet port and the outlet port, respectively, for containing lubrication fluid supplied thereto and directing the lubrication fluid to the impeller as the impeller is rotated drawing lubrication fluid through the enclosing means, and a fluid passageway defined in the seal assembly for directing lubrication fluid to said sealing surfaces as the impeller rotates, moving lubrication fluid through the seal chamber.

These and other objects are achieved by the present invention which has provided a regenerative turbine flow inducer for double or tandem mechanical seals of a liquid pump.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIG. 5 is a side elevational view of the impeller of the flow inducer provided by the present invention;

FIG. 6 is a sectional view taken along the lines 6—6 of FIG. 5;

FIG. 7 is a side elevational view of one of a cooperating pair of liners of the flow inducer;

FIG. 8 is a sectional view taken along the lines 8—8 of FIG. 7;

FIG. 9 is a side elevational view of the other of the cooperating liners of the flow inducer;

FIG. 10 is a sectional view taken along the lines 10—10 of FIG. 9;

FIG. 11 is a side elevational view of an outer rotating seal member of the seal assembly;

FIG. 12 is a side elevational view of an inner rotating seal member of the seal assembly;

FIG. 13 is a side elevational view of a circulator spacer of the seal assembly;

FIG. 14 is a fragmentary view of the circulator spacer taken along the lines 14—14 of FIG. 13;

FIG. 15 is a sectional view taken along the lines 15—15 of FIG. 13;

FIG. 16 is a simplified representation of the regenerative circulation provided between the periphery of the impeller and the cooperating liners;

FIG. 17 is a fragmentary, longitudinal sectional view of a mechanical seal arrangement with tandem seals which incorporates the regenerative turbine flow inducer provided by the present invention;

FIG. 18 is a schematic diagram illustrating the regenerative flow inducer connected for use with a double-seal arrangement;

FIG. 19 is a schematic diagram illustrating the regenerative flow inducer used with a tandem-seal arrangement;

FIG. 20 is an end view of a mechanical seal arrangement with tandem seals which incorporates an improved driving and sealing arrangement provided by the present invention;

FIG. 21 is a fragmentary, longitudinal sectional view of the mechanical seal arrangement illustrated in FIG. 20;

FIG. 22 is an end view of a mechanical seal arrangement similar to that illustrated in FIGS. 20 and 21, but which incorporates the regenerative turbine flow inducer provided by the present invention;

FIG. 23 is a fragmentary, longitudinal sectional view of the mechanical seal arrangement illustrated in FIG. 22;

FIG. 24 is a fragmentary end view of the impeller sleeve of the flow inducer of FIG. 22, broken away to show the housing inner surface which serves as the inner liner for the impeller; and FIG. 25 is a fragmentary end view of the inner sleeve of the flow inducer of FIG. 22.

DESCRIPTION OF A PREFERRED EMBODIMENT

Figure 1:
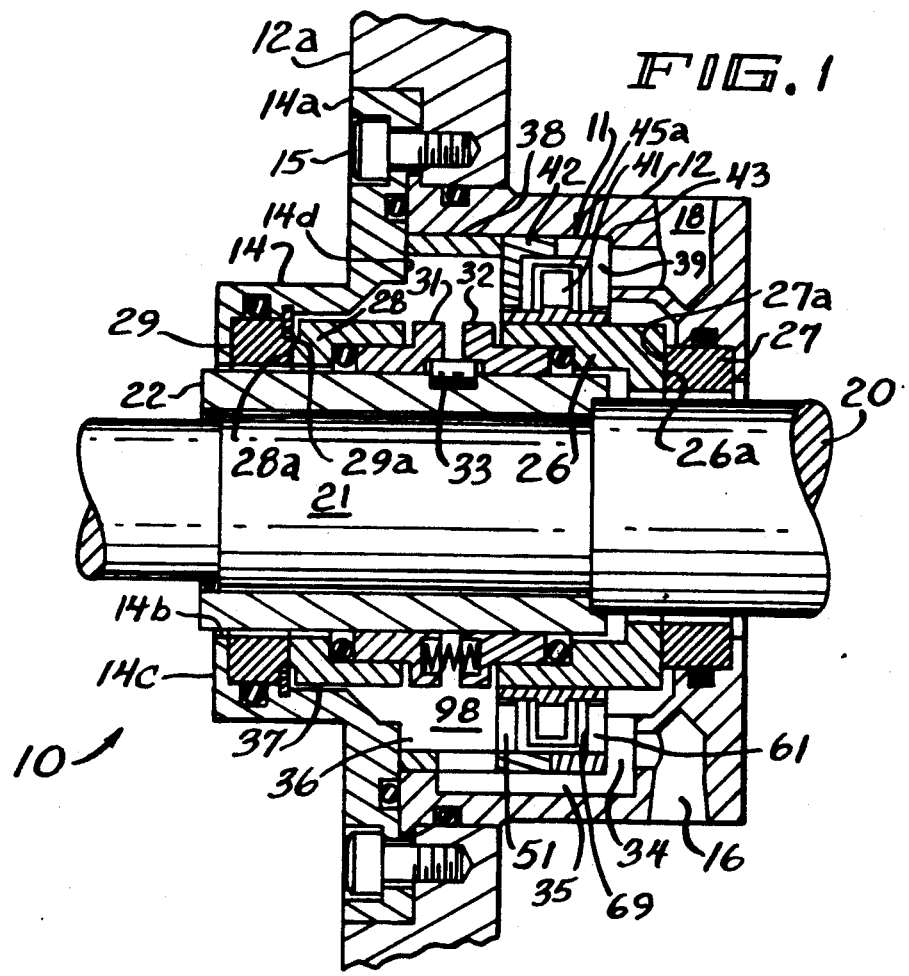
FIG. 1 is a longitudinal sectional view of a seal assembly with a double seal which incorporates the regenerative turbine flow inducer provided by the present invention.

Referring to FIG. 1, there is illustrated a seal assembly 10 incorporating the turbine flow inducer 11 provided by the present invention. The assembly includes an outer seal cartridge 12 and an inner seal cartridge 14 which have mating peripheral flanges 12a and 14a respectively adapted to receive suitable fasteners 15 to secure the inner seal cartridge 14 to the outer cartridge 12, forming a closed housing.

The outer seal cartridge 12 has a bore through its side wall defining an inlet port 16 for the housing and a further bore through its side wall defining an outlet port 18 for the housing. Lubricating fluid from a reservoir is supplied to the interior of the seal assembly for lubricating sealing surfaces as will be shown. The lubricating fluid is supplied to the interior of the housing through the inlet port 16 and is returned to the reservoir through the outer port 18.

Extending axially through the housing formed by outer cartridge 12 and inner cartridge 14 is a shaft 20 of the pump (not shown) associated with the turbine flow inducer. The shaft 20 passes through axial openings 12b and 14b in the end walls 12c and 14c of the outer and inner cartridges. The shaft 20 has a reduced diameter portion 21 which carries a sleeve 22.

The assembly further includes a rotatable outer seal ring 26 and a stationary outer seal seat 27, an inner seal assembly having a rotatable inner seal ring 28 and a stationary inner seat 29. The outer seal ring 26 has a sealing surface 26a which engages a sealing surface 27a of the outer seat. The inner seal ring 28 has a sealing surface 28a which engages a sealing surface 29a on the inner seat. A pair of compression rings 31 and 32 are keyed to the shaft by a drive key 33 and are interposed between the seal assemblies. The compression rings are springs biasing the inner seal assembly into engagement with the inner surface of annular flange 14b of the inner cartridge and biasing the outer seal assembly into engagement with the inner surface of annular flange 12b of the outer cartridge.

The turbine flow inducer 11 is located within the housing between the inner and outer seal assemblies. The turbine flow inducer 11 includes an impeller 41, an inner liner 42 and an outer liner 43. An annular circular spacer 38 is interposed between the inner liner 42 and the inner surface of the inner cartridge 14.

In accordance with the present invention, the turbine flow inducer 11 enhances the flow of lubricating or buffer fluid flow into and out of the seal chamber to lubricate the sealing surfaces 26a, 27a of the outer seal assembly and sealing surfaces 28a, 29a of the inner seal assembly. Specifically, the inner and outer cartridges 12 and 14 and the elements of the assembly contained therewithin are constructed and arranged to define fluid flow channels from the buffer fluid inlet to the buffer fluid outlet which direct the buffer fluid to the sealing surfaces of the inner and outer sealing assemblies. Lubricating fluid supplied to the inlet port 16 is directed to an inner annular chamber 34 which encircles the sealing surfaces 26a, 27a of the outer seal assembly. The chamber 34 is communicated through a fluid passageway 35 with a further inner annular chamber 36 which includes a portion 37 which encircles the inner seal ring 28 and directs lubricating fluid to the sealing surfaces 28a and 29a of the inner seal assembly.

In accordance with another aspect of the invention, the lubricating fluid is directed to both the inner side and the outer side of the impeller assembly. To this end, the inner liner 42 and the outer liner 43 have notches 51 and 61, respectively, which communicate the chambers 36 and 34 with the interior of the impeller subassembly. The turbine impeller and inner and outer liners contain the fluid and direct its flow by means of the recirculation or regenerative action of the regenerative turbine pump. This action is positive and dispels trapped vapor, preventing vapor lock. The differential pressure is relatively high and is effective because of the regenerative turbine effect. The outlet port 18 is communicated with the discharge port 39 of the impeller subassembly through passageway 44.

Figure 4:
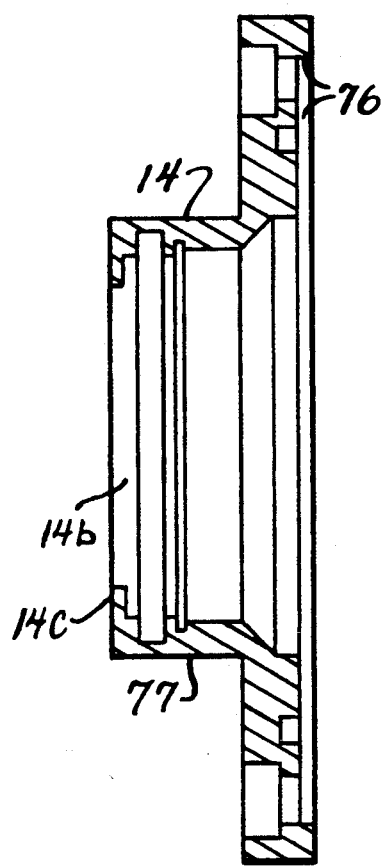
FIG. 4 is a side sectional view of the inner cartridge of the seal assembly.
Figure 3:
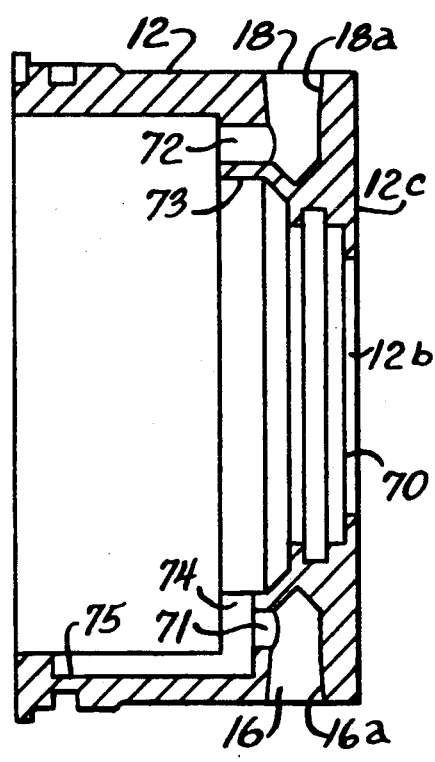
FIG. 3 is a side sectional view of the outer cartridge of the seal assembly.

Referring to FIGS. 1, 3 and 4, the outer seal cartridge 12 is a generally cylindrically-shaped member having axial bore 12b through its end wall 12c. The inlet port 16 and outlet port 18 are defined by radial bores 16a and 18a in the cartridge 12 near its end wall 12c. Axial bores 71 and 72 communicate the ports 16 and 18 with the interior of the cartridge 12. Interiorly from its end wall 12c, the inner wall of the cartridge defines a first annular shoulder 70 which mounts the outer seat 27 and a second annular shoulder 73 of a diameter greater than the diameter of the outer seal ring defining an annular gap or space 74 which forms a portion of chamber 34. The cartridge 12 has a groove 75 formed in a portion of its inner wall near the inlet port 16, defining passage 35.

The inner seal cartridge 14 has a flat plate-like portion 76 which mates with the inner end of the outer seal cartridge, and is secured thereto by fasteners 15. The inner seal cartridge 14 has a hub portion 77 in which are mounted the inner seat 29 and the inner seal ring 28.

Figure 2:
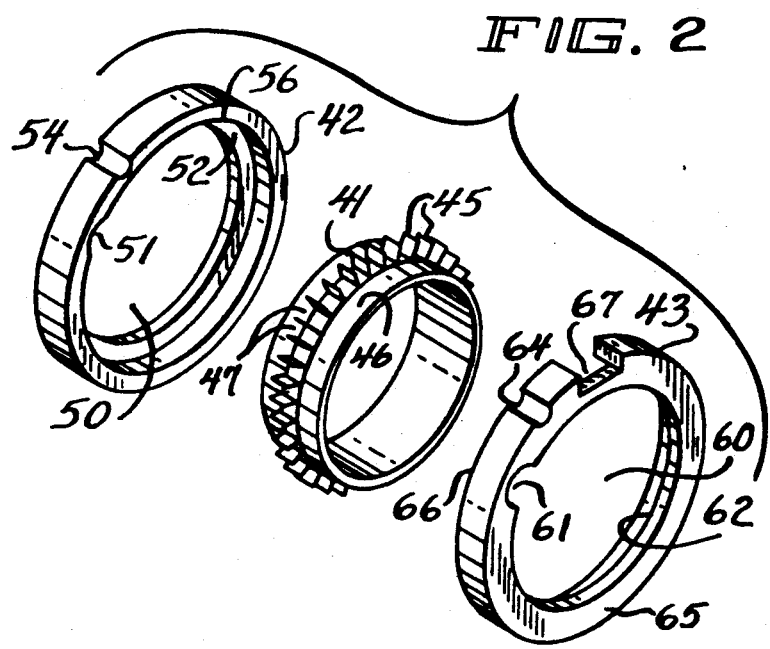
FIG. 2 is an exploded, perspective view illustrating the impeller and the inner and outer liners of the flow inducer illustrated in FIG. 1.

Referring to FIGS. 2 and 5–6, the impeller 41 is a generally annular-shaped member having a plurality of radially extending vanes 45 formed at its peripheral edge 46. The vanes 45 are spaced apart defining a gap 47 between each pair of adjacent vanes. By way of example, there may be thirty-six vanes, equally spaced about the periphery of the impeller 41. However, the number of vanes will vary as a function of the outer diameter of the impeller 41. The impeller is press fit onto the outer seal ring 26 as shown in FIG. 1.

Referring to FIGS. 2 and 7–8, the inner liner 42 is an annular member having an axial bore 50. The member is formed with a radial notch 51, semicircular in shape, which opens inwardly to the bore 50. The member has its inner surface stepped, defining an annular shoulder 52 which extends from one side of the notch 51 to the other and has a raised portion 53 at the second side to the notch. The member has an inwardly directed radial notch 54 at its upper edge. The member has an outer end surface 55 and an inner surface 56.

Referring to FIGS. 2 and 9–10, the configuration of the outer liner 43 is substantially complementary and symmetrical to that of the inner liner 42. The outer liner 43 comprises an annular member having an axial bore 60. The member is formed with a radial notch 61 of the shape of notch 51, which opens inwardly to the bore 60. The member has a raised portion 63 complementary with raised portion 53 on the inner liner 42. Liner 43 has an inwardly directed notch 64 at its upper edge. The liner member 43 has an outer end surface 65 and an inner surface 66. The member has a further notch 67 which is communicated with notch 61 by a shoulder 62 formed on the inner surface of the member. The notch 67 is generally rectangular in shape and opens outwardly of the element toward its outer periphery. The inner diameters of the bores 50 and 60 correspond to the outer diameter of the periphery of the impeller so that the peripheral surface 46 of the impeller passes through the liners 42 and 43 when the liners are assembled with the impeller as illustrated in FIG. 1. The inner diameter of the shoulders 52 and 53 corresponds to the height of the vanes 45, but provide a slight gap 45a therebetween as illustrated in FIG. 1. When the liners 42 and 43 are assembled together, with their inner end surfaces 56 and 66 engaging, the shoulders 52 and 62 define a fluid passageway or channel 69 from the inlet or suction port of the liners defined by the radial notches 51 and 61 and the outlet or discharge port defined by the rectangular notch 67.

Referring to FIGS. 1 and 11, outer seal ring 26 is a sleeve-shaped element having an inner surface 80 and an outer, sealing surface 26a and having a through bore 82. The member is counter sunk from its inner end surface toward its outer end surface defining a first annular inner portion 83 of a diameter slightly greater than the diameter of the bore and a second annular inner diameter 84 slightly greater than the diameter 83. The diameter of the bore 82 corresponds to the diameter of the raised portion or largest diameter portion of the shaft 20 and diameter 83 corresponds to the outer diameter of the sleeve 22 which is positioned on the reduced diameter portion 21 of the shaft. The outer seal ring 26 has a plurality of arcuate notches, such as notches 85 and 86, formed in its inner end surface.

The rotating outer seal ring 26 has its end sealing surface 26a engaging outer stationary seat 27 as shown in FIG. 1. Stationary seat 27 is an annular member which seats on shoulder 70 (FIG. 3) of the outer cartridge 12.

Referring to FIGS. 1 and 12, the rotating inner seal ring 28 is similar to seal ring 26, but has a larger through bore 92 which corresponds to the outer diameter of the sleeve 22 and has only one stepped inner surface portion 94 which corresponds to stepped surface portion 84 of seal ring 26. The inner seal ring 28 has an inner end surface 90 and an outer, sealing surface 27a which operates against the inner stationary seat 29. The inner seat 29 is seated in hub portion 77 (FIG. 4) of the inner cartridge 14.

Referring now to FIGS. 1 and 13–15, the spacer 38 is an annular element. The outer diameter of the spacer corresponds to the inner diameter of the outer seal cartridge 12. The inner diameter of the spacer corresponds to the overall diameter of the impeller 41, defining a chamber 98 within the cartridge between the inner seal assembly and the impeller assembly. The spacer 38 has an inwardly directed end surface 101 and an outwardly directed end surface 102. A notch 103 generally rectangular in shape is formed through its side wall near its outwardly directed end surface 102. The notch 103 through spacer ring 38 communicates passageway 35 with inner chamber 36. A semicircularly-shaped notch 104 is formed through its side wall 106, spaced radially of the notch 103. The spacer 38 is interposed between the impeller assembly and the inner wall 14d of the inner cartridge 14.

Referring to FIG. 18, there is illustrated a schematic diagram of a pressurized external fluid reservoir with forced circulation for use with the double-seal bearing assembly 10. The system includes a lubrication fluid reservoir 120 having its outlet connected through a heat exchanger 121 to the inlet port 16 of the seal assembly 10. The discharge port 18 of the seal assembly 10 is connected through a flow indicator 123 to the inlet of the reservoir. A suitable pressure indicator 124 and pressure switch 125 may be connected to the outlet port 18 as is known in the art. The reservoir 120 is connected to an external pressure source through a normally open valve 126.

Referring to FIGS. 1, 16 and 18, as the lubrication fluid is supplied to the seal assembly 10, the fluid is pumped through the seal assembly 10 by the regenerative turbine flow inducer. The fluid is drawn into the inlet port 16 through and into chamber 34 where a portion of the fluid is directed to the seal surfaces 26a and 27a of the outer seal assembly as the result of the movement or turbulence caused by the fluid being drawn into the impeller system. A portion of the fluid is drawn into the impeller assembly through the inlet or suction inlet defined by notch 61 in the outer liner. Also, a portion of the fluid is drawn through channel 35 into chamber 36 and into the impeller system through notch 51 in the inner liner 42. The pressure created in the fluid in chamber 36 moves the fluid through channel 37 to sealing faces 28a and 29a. The fluid is drawn along the channel 69, the fluid being circulated radially inwardly and regeneratively due to the action of the rotating turbine blades in cooperation with the liners 42 and 43.

As illustrated in FIG. 16, the fluid on the outer side of the impeller 41 flows in a clockwise direction across the outer half of the blades 45 whereas fluid on the inner side of the impeller flows in a counterclockwise direction across the other half of the turbine blades 45. The fluid flow is constrained by the inner surface of the upper wall and the inner surface of the side walls of the two channels defined by the inner and outer liners 42 and 43. This regenerative circulation increases the pressure of the fluid as it is flowing from the suction inlet of the impeller assembly to the discharge port and thence out through the outlet port 18 of the bearing assembly 10. This action creates pressure in the fluid which enhances the movement of the lubricating fluid to both the inner and outer seal assemblies and the regenerative pressure generated forces the fluid between the mating or opposing bearing surfaces of the inner and outer bearing assemblies and carries away the heat of friction.

Referring to FIG. 17, there is illustrated a mechanical sealing arrangement 130 including tandem seal assemblies 131 and 132, each including a fixed seal 133 and a rotating seal 134 mounted within a housing 135. The seal assembly 132 is provided with a regenerative turbine flow inducing assembly including an impeller 141 and a pair of liners 142 and 143 in accordance with the present invention and which operates in a manner similar to that described above for the double seal arrangement illustrated in FIG. 1, which includes impeller 41 and liners 42 and 43. The housing 135 has a suction or inlet port 146 and a discharge or outlet port 148. The inlet port communicates with both sides of the regenerative turbine flow inducing assembly as described hereinbefore. The discharge port 148 is communicated with the discharge outlet of the regenerative turbine flow inducing assembly. The inlet port 146 and the outlet port 148 are connected to a suitable nonpressurized external fluid reservoir 140 as illustrated in FIG. 19 which is the type typically used with tandem-seal arrangements.

The rotating seal 134 of seal assembly 131 is driven by the sleeve shoulder 157 through lateral pins 154 in drive collar 151, and the rotating seal 134 of seal assembly 132 is driven by the sleeve shoulder 157' through lateral pins 154' in drive collar 151' The sleeves 152 and 152' are driven by lateral compression of a nut (not shown). The drive collar 151 carries the drive pins, such as drive pin 154 which is received in a slot 134a in the rear surface of the rotating seal 134. An O-ring 155 is interposed between the drive collar 151 and the rotating seal member 134. The seal ring 155 is located in an annular channel 156 defined by a step counter bore in the rotating seal member 134. The drive collar 151 has an annular wall portion 151a which is maintained in engagement with the O-ring 156 by a compression spring 157a, maintaining a squeeze on the O-ring 155. The fixed seat seal 133 is maintained fixed by a seating pin 158 which is received in a suitable aperture 159 in the back-up shoulder 160 of the fixed seal 33 and an aperture 162 in the inner surface 163 of the housing 135. Similarly, seal assembly 132 has its rotating seal 134 driven by a drive collar 151' which has an extension portion 151a' which maintains sealing ring 155' in compression. The fixed seal 133 of seal assembly 132 is maintained fixed by pin 158' in the back-up shoulder 160' of the fixed seal 133.

Referring now to FIGS. 20 and 21, there is illustrated a further embodiment for a tandem seal arrangement 170 having tandem seal assemblies 171 and 172, each including a fixed seal 173 and a rotating seal 174 mounted within respective seal chambers 169 and 169a of a housing or cartridge 175. Seal chamber 169 is defined by annular surface 175a of the housing, and generally planar opposing surfaces 175b and 175c. Seal chamber 169a is defined by annular surface 175a' and opposing surfaces 175b' and 175c'. Seal assembly 171 is the primary seal and seal assembly 172 is the secondary seal. Each seal assembly, such as seal assembly 171 includes a drive collar 176 which is pressed on sleeve 177 which in turn is indexed to shaft 20. The seal assembly 171 further includes a compression washer 178, a compression spring 179, a sleeve member 180, and a sealing ring 181.

Sleeve member 180 couples the drive collar 176 to the rotating seal 174. The sleeve member 180 has a cylindrical portion 188 which encircles the rotating seal 174 and defines four inwardly directed dimples, such as dimple 191 shown in FIG. 21 which are received in corresponding notches 192 in the rotating seal 174. The associated pairs of dimples and notches may be equally spaced about the outer periphery of the rotating seal and the inner surface of the sleeve member 180. The sleeve member 180 has an outwardly extending flange 193 at one end and is offset inwardly near its other end defining an inner shoulder 194. The free end of the sleeve member 180 extends through an opening 195 in the drive collar 176 and is movable axially relative thereto.

The compression spring 179 encircles the sleeve member 180 and the rotating seal 174, the compression spring 179 being compressed between the flange 193 and the inner surface of the housing 175 at 175c. The compression washer 178 has its peripheral edge 178a seated on the annular internal shoulder 194 of sleeve member 180 and its annular lip portion engaging the sealing O-ring 181, compressing the sealing O-ring 181. The sleeve 177 for seal assembly 172 has a flange portion 177a which serves as a stop for the inner end of the spring 179.

The fixed seal 17 is fixed relative to the housing 175 by a plurality of drive tabs, such as drive tab 196, which extends inwardly into notches such as notch 197, formed in the surface 198 of the fixed seal 173.

The tandem seal arrangement 170 illustrated in FIGS. 20 and 21 is characterized by a minimized axial length because the compression spring encircles the rotating portion of the seal assembly rather than being axially aligned with the drive collar as illustrated for the seal assembly 131 illustrated in FIG. 17. Also, the axial length of the fixed seal member 173 is less than the axial length of the fixed seal member 133 (FIG. 17) in minimizing the axial length of the seal assembly. This reduction in axial length is made possible by the use of the drive tabs rather than the drive pins located in the backup shoulder as are employed in the seal assembly 131 of FIG. 17.

The housing or cartridge 175 has a fluid inlet port 200 and a fluid outlet port 201 for supplying lubricating fluid to the seal chamber 169a of the housing 175 which contains the secondary seal assembly 172. The fluid inlet 200 and the fluid outlet 201 are spaced apart radially slightly less than 90° along the outer peripheral surface of the housing 175. The fluid inlet 200 and fluid outlet 201 are connected to inlets and outlets, respectively, of a lubrication fluid reservoir, such as fluid reservoir 120 or 140, as illustrated in FIGS. 18 and 19, for seal assemblies 10 and 130. Separate lubrication fluid connections are provided for the primary seal 171, such as lubricating fluid outlet 204 shown in FIG. 21. The inner surface 175a' of the housing 175 in the seal chamber 169a defines a downward extending block 205 which extends along the upper inner surface 175a' of the housing 175 the length of the seal chamber 169a between opposing surfaces 175b' and 175c' and along an axis parallel to the axis of rotation for the shaft 170 and the rotary unit including the drive collar 176, the sleeve 177, the rotating seal 174, the spring 179, etc.

The rotation of the rotary unit including the spring 179, causes a circular motion of the secondary sealing fluid introduced by fluid inlet 200. This circular flow motion is interrupted by block 205 causing a slight build-up of pressure at the fluid outlet 201. This causes the secondary fluid to circulate out of the secondary seal chamber 169a into the reservoir and back to the secondary seal chamber 169a through the fluid inlet 200. This pressure build-up is approximately six inches to one foot. This method of fluid circulation has been employed in the regenerative turbine industry for many years.

Referring now to FIGS. 22-25, there is illustrated a tandem seal arrangement 170' which is similar to tandem seal arrangement 170 illustrated in FIGS. 20 and 21, but which includes a regenerative turbine circular flow inducer. The elements of the tandem seal arrangement 170' which correspond to elements of the tandem seal arrangement 170 have been given the same reference numeral and similar elements have been given the same reference numeral with a prime notation. The tandem seal arrangement 170' includes a housing 175' having a lubricating fluid inlet 200' and a lubricating fluid outlet 201' which communicate with the secondary seal chamber 169a' for supplying fluid from a reservoir to the secondary seal chamber. The primary seal 171 for the seal arrangement 170' is the same as the primary seal 171 for the seal arrangement 170. The flange portion 177a' for sleeve 177 of the secondary seal assembly 172' has a plurality of vanes 215 projecting outwardly radially from its peripheral edge 216 and a pair of annular flanges 217 and 218 which extend laterally from opposite sides of the flange 177a'. Thus, the sleeve 177' for seal assembly 172', defines a turbine impeller which is similar to the impeller 41 of the turbine flow inducer 11 illustrated in FIG. 1 and the impeller 141 of the regenerative turbine flow inducing assembly for the mechanically sealing arrangement 130 illustrated in FIG. 17.

The secondary seal assembly 172' includes a liner sleeve 220 which encloses the outward directed surface of the impeller sleeve 177', the inner surface 175c of the housing providing the function of a liner at the inward directed surface of the impeller sleeve. The liner sleeve 220 is a tubular member which extends between surfaces 175b' and 175c' coaxial with the shaft 20 and the rotary unit. The outer surface 223 of the sleeve liner is spaced from housing inner surface 175a' defining an annular channel 230 which extends from the outer edge of the impeller sleeve to the fluid outlet 201'. The liner sleeve 220 has an upwardly directed flange 221 at its inner edge, the flange 221 having a raised block portion 222 (FIG. 25) which is disposed adjacent to, but spaced apart from the Vanes 215 at the peripheral edge of the impeller sleeve 177'. The liner sleeve 220 serves as an outer liner for the turbine flow inducer.

The inner surface 175c' of the housing performs the function of an inner liner. A groove 225 cut in the surface 175c' accommodates the flange 217 of the impeller sleeve. The surface 175c' has an oval channel 228, illustrated in FIG. 24, disposed adjacent to the vanes 215 to direct lubricating fluid supplied to the inlet 200' to the vanes 215 to create the regenerative turbine effect as the turbine impeller sleeve rotates.

As the rotary unit including the turbine impeller sleeve 177', and the spring 179, etc. rotates, lubrication fluid is drawn into the groove in the inner surface of the housing and is drawn to the vanes 215, impinging against the block 222 wherein it is directed or drawn into and through the channel 230 and out through the fluid outlet 201'. The block 222 performs the same function as block 205 (FIG. 20) in breaking up or interrupting the fluid flow causing an increase of pressure in the channel 230 and at the outlet 201' which enhances the fluid flow through the portion of the secondary seal chamber in which the impeller sleeve is located. The liner sleeve 220 seals off the outlet passage 230, substantially eliminating a back flow of lubricating fluid into the portion 232 of the inner seal chamber 169a' which contains the spring 179, the sleeve 180, etc. With this arrangement, the regenerative turbine circulator generates a pressure build up in the range of eight feet to fifteen feet at the fluid outlet 201'.

I claim:

1. In an apparatus including a housing, a rotatable shaft extending through said housing, and a bearing assembly supporting the shaft in said housing, said housing defining a seal chamber, said bearing assembly including at least one seal assembly in said seal chamber, said seal assembly including a fixed seal means having a sealing surface and a rotatable seal means having a sealing surface engaging said sealing surface of said fixed seal means of said seal assembly, said housing having a fluid inlet port and a fluid outlet port, said inlet port communicating with said seal chamber and being connectable to a source of lubricating fluid, said outlet port communicating with said seal chamber, flow inducing means for moving lubricating fluid through said seal chamber from said inlet port to said outlet port, comprising: an impeller rotatably mounted in said seal chamber, enclosing means enclosing said impeller, said enclosing means having at least one fluid inlet in fluid communication with said inlet port and a fluid outlet in fluid communication with said outlet port, said enclosing means being adapted to contain lubrication fluid supplied thereto through said fluid inlet and direct the lubrication fluid to said impeller, permitting said impeller to produce regenerative fluid flow and thereby increase the pressure of the fluid as said impeller is rotated drawing lubrication fluid through said enclosing means from said fluid inlet to said fluid outlet, and a fluid passageway defined in said seal chamber for directing lubrication fluid to said sealing surfaces as said impeller rotates, moving lubrication fluid through said seal chamber and out to a cooling reservoir to be returned to said seal chamber.

2. Apparatus according to claim 1 wherein said enclosing means has first and second fluid inlets in fluid communication with said inlet port.

3. Apparatus according to claim 2, wherein said impeller comprises an annular member and said first and second fluid inlets are defined by said enclosing means on opposite sides of said annular member.

4. Apparatus according to claim 1, wherein said impeller comprises an annular member having a plurality of vanes defined about its outer peripheral edge, said enclosing means defining first and second fluid flow channels therethrough adjacent to said vanes on both sides of said impeller peripheral edge, whereby regenerative turbine fluid flow is produced by said impeller as said impeller rotates relative to said enclosing means.

5. Apparatus according to claim 4, including means mounting said impeller on said shaft for rotation therewith.

6. Apparatus according to claim 4, wherein said enclosing means comprises an inner liner and an outer liner defining an enclosure for said impeller, each of said liners having an annular groove on an inner surface thereof adjacent to said impeller, said annular grooves defining said first and second fluid flow channels through said enclosing means, said inner liner having an opening communicating with sad first fluid flow channel defining said fluid inlet at a first side of said enclosing means, said outer liner having an opening communicating with said second fluid flow channel at a second side of said enclosing means, defining a further fluid inlet at a second side of said enclosing means, and one of said liners having a further opening communicating with both of said fluid flow channels, defining said fluid outlet.

7. In an apparatus including a housing, a rotatable shaft extending through said housing, and a bearing assembly supporting the shaft in said housing, said housing defining a seal chamber, said bearing assembly including an inner seal assembly and an outer seal assembly in said seal chamber, said inner seal assembly including fixed seal means having a sealing surface and a rotatable seal means having a sealing surface engaging said sealing surface of said fixed seal means of said inner seal assembly, and said outer seal assembly including a fixed seal means having a sealing surface and a rotatable seal means having a sealing surface engaging said sealing surface of said fixed seal means of said outer seal assembly, said housing having a fluid inlet port and a fluid outlet port, said inlet port communicating with said seal chamber and being connectable to a source of lubricating fluid, said outlet port communicating with said seal chamber, flow including means for moving lubricating fluid through said seal chamber from said inlet port to said outlet port, comprising: an impeller rotatably mounted in said seal chamber and located between said inner and outer seal assemblies, enclosing means enclosing said impeller, said enclosing means having at least one fluid inlet in fluid communication with said inlet port and a fluid outlet in communication with said outlet port said enclosing means being adapted to contain lubrication fluid supplied thereto through said fluid inlet and direct the lubrication fluid to said impeller, permitting said impeller to produce regenerative fluid flow to thereby increase the pressure of the fluid as said impeller is rotated drawing lubrication fluid through said enclosing means from said fluid inlet to said fluid outlet, and first and second fluid passageways defined in said seal chamber for directing lubrication fluid to said sealing surfaces of said inner and outer seal assemblies, respectively, as said impeller rotates, moving lubrication fluid through said seal chamber, and out to a cooling reservoir to be returned to said seal chamber.

8. Apparatus according to claim 7 wherein said enclosing means has first and second fluid inlets in fluid communication with said inlet port.

9. Apparatus according to claim 8, wherein said impeller comprises an annular member and said first and second fluid inlets are defined by said enclosing means on opposite sides of said annular member.

10. Apparatus according to claim 7, wherein said impeller comprises an annular member having a plurality of vanes defined about its outer peripheral edge, said enclosing means defining first and second fluid flow channels therethrough adjacent to said vanes on both sides of said impeller peripheral edge, whereby regenerative turbine fluid flow is produced by said impeller as said impeller rotates relative to said enclosing means.

11. Apparatus according to claim 10 including means mounting said impeller on said shaft for rotation therewith.

12. Apparatus according to claim 10, wherein said enclosing means comprises an inner liner and an outer liner defining an enclosure for said impeller, each of said liners having an annular groove on an inner surface thereof adjacent to said impeller, said annular grooves defining said first and second fluid flow channels through said enclosing means, said inner liner having an opening communicating with said first fluid flow channel defining said fluid inlet at a first side of said enclosing means, said outer liner having an opening communicating with said second fluid flow channel at a second side of said enclosing means, defining a further fluid inlet at a second side of said enclosing means, and one of said liners having a further opening communicating with both of said fluid flow channels, defining said fluid outlet.

13. Apparatus according to claim 12 wherein said enclosing means has first and second fluid inlets and wherein said first fluid inlet is in fluid communication with said first fluid passageway and said second fluid inlet is in fluid communication with said second fluid passageway and wherein said second passageway is in fluid communication with said first passageway.

14. Apparatus according to claim 7 wherein said inner and outer seal assemblies are disposed in tandem.

15. In an apparatus including a housing, a rotatable shaft extending through said housing, and a bearing assembly supporting the shaft in said housing, said housing defining a seal chamber having first and second fluid passageways, said bearing assembly including an inner seal assembly and an outer seal assembly in said seal chamber, said inner seal assembly including a fixed seal means having a sealing surface and a rotatable seal means having a sealing surface engaging said sealing surface of said fixed seal means of said inner seal assembly, and said outer seal assembly including a fixed seal means having a sealing surface and a rotatable seal means having a sealing surface engaging said sealing surface of said fixed seal means of said outer seal assembly, said housing having a fluid inlet port communicating with said first and second fluid passageways in said seal chamber and a fluid outlet port communicating with said seal chamber, said inlet and outlet ports being communicated with a source of lubricating fluid, flow inducing means for moving lubricating fluid from said source through said seal chamber from said inlet port to said outlet port and for directing lubrication fluid to said sealing surfaces of said inner and outer seal assemblies, comprising: a turbine impeller rotatably mounted in said seal chamber and located between said inner and outer seal assemblies, enclosing means including an inner liner and an outer liner enclosing said impeller, said enclosing means having first and second fluid inlets in fluid communication with said inlet port through said first and second fluid passageways, respectively, and a fluid outlet in communication with said outlet port, said inner and outer liners containing lubrication fluid supplied thereto through said first and second fluid inlets and directing the lubrication fluid to said impeller as said impeller rotates, drawing lubrication fluid through said enclosing means from said first and second fluid inlets to said fluid outlet and out to a cooling reservoir to be returned to said seal chamber whereby said impeller produces regenerative fluid flow for lubrication fluid being moved through said seal chamber.

16. The apparatus according to claim 15 wherein said turbine impeller comprises an annular member having a plurality of vanes projecting a radially outwardly from its periphery, said vanes being spaced apart equally along the circumference of said annular member defining spaces therebetween.

17. The apparatus according to claim 16 wherein said liners have opposing inner surfaces, said impeller being located therebetween, and said inner surfaces of said liners having annular grooves therein disposed adjacent to said vanes of said impeller for directing lubrication fluid into said spaces for engaging said vanes to permit said impeller to produce said regenerative fluid flow as the fluid is moved through said enclosing means, thereby enhancing movement of the portion of the lubricating fluid being directed to said first and second bearing assemblies.

18. In an apparatus including a housing, a rotatable shaft extending through said housing, and a bearing assembly supporting the shaft in said housing, said housing defining a seal chamber, said bearing assembly including at least one seal assembly in said seal chamber, said seal assembly including a fixed seal means having a sealing surface and a rotatable seal means having a sealing surface engaging said sealing surface of said fixed seal means of said seal assembly, said housing having a fluid inlet port and a fluid outlet port, said inlet port communicating with said seal chamber and being connectable to a source of lubricating fluid, said outlet port communicating with said seal chamber, flow including means for moving lubricating fluid through said seal chamber from said inlet port to said outlet port, comprising: an impeller rotatably mounted in said seal chamber, said impeller including an annular member having a plurality of vanes projecting radially outwardly from its periphery, said vanes being spaced apart equally along the circumference of said annular member defining spaces therebetween, and fluid directing means disposed in operative relation with said vanes of said impeller and adapted to direct lubrication fluid onto said vanes as said impeller is rotated to thereby cause said impeller to impart regenerative flow to said fluid as the fluid is moved through said seal chamber, thereby increasing the pressure of the fluid being moved through said seal chamber and out to a cooling reservoir to be returned to said seal chamber.

* * * * *

UNITED STATES PATENT AND TRADEMARK OFFICE
CERTIFICATE OF CORRECTION

PATENT NO. : 5,238,253
DATED : August 24, 1993
INVENTOR(S) : Leonard J. Sieghartner It is certified that error appears in the above-indentified patent and that said Letters Patent is hereby corrected as shown below:

| COLUMN | LINE | |
|---|---|---|
| 8 | 46 | Delete "17" and insert --173-- |
| 9 | 44 | Delete "177" and insert --177'-- |
| 9 | 57 | Delete "175c" and insert --175c'-- |
| 11 | 21 | Delete "sad" and insert --said-- |

Signed and Sealed this

Twenty-ninth Day of March, 1994

Attest:

BRUCE LEHMAN

Attesting Officer     Commissioner of Patents and Trademarks